Patented Sept. 11, 1934

1,973,473

UNITED STATES PATENT OFFICE 1,973,473

GYPSUM CEMENT AND METHOD OF MAKING THE SAME

Robert S. Edwards, Milton, Mass., assignor to Rumford Chemical Works, Rumford, R. I., a corporation of Rhode Island No Drawing. Application April 22, 1931, Serial No. 532,123. Renewed April 17, 1934

3 Claims. (Cl. 222—6)

My present invention relates to a cement of the Keene type. Keene cement as such is very old, well known and generally used. As a product its outstanding value lies in its capacity for re-tempering so that, unlike other cements or plaster it can be mixed and stored for future use and yet set up as a strong plaster. This, with its hardness when set and the fact that it can take a smooth finish or polish has made it for many years a most useful plaster product.

To produce such cementitious material great care has been required in the selection of rock of high quality and in matter of processing. This is particularly true with respect to the selection of rock having a minimum amount of carbonates possible because traces of carbonates which would leave even small amounts of carbon dioxide in the wasted rock would cause disruption or weakening of the Keene's cement after being applied to the wall. The rock therefore picked for purity and cleaned, has been crushed and burned in various ways in an effort to get uniformity. As a product on which a high demand for efficiency is placed, maximum quality is of great importance. Efficiency depends on uniformity. As appraised by me the difficulty has been that natural rocks have variant qualities or properties even when classed as "pure" and such rocks when crushed are processed under such indefinite or undeterminable conditions and stages or degrees of reaction that no exactitude is possible or degree of perfection assignable. Crushed rock of varying characteristics and of different sizes cannot be fired or burned to a standard uniformity. Furthermore, the crystalline structure and density of the natural rock varies.

My concept as will be hereinafter described contemplates the adoption of a basis of fundamental standardization. This means that I propose to deal with the material on a basis of ultimate crystalline uniformity and particle size.

This may be approximate as in finely ground and/or averaged materials or absolute as in precipitates from solutions of such materials, from which materials the troublesome carbonates have been eliminated.

Proceeding to a discussion of such products and practices I will first describe the characteristics of the product and then the processes involved. In the ultimate set of the cement whether freshly mixed or re-gauged after being mixed, the factor of strength and ultimate hardness lies in a maximum of finely divided interstitial surfaces of potential contact or bonding and a maximum uniformity or average of completeness of burning or condition which permits the action of chemical acceleration to proceed at a faster and more uniform rate.

As above stated, this cannot be attained with material of natural formation by casual averages, nor by incidental or accidental averages of the firing or burning of materials in fragments or crushed gypsum rock of different sizes or shapes.

According to my concept I therefore contemplate first a material of definite ultimate crystalline condition throughout and the firing with such uniformity as to make each ultimate crystal as nearly cementitiously efficient as possible. This can only be accomplished by uniform formation of the material. Then by uniform firing a truly ultimate efficiency may be predicated.

Considered broadly, the first step is to provide the calcium sulphate from whatever source as a finely divided and preferably crystalline product as a powder or semi-dry magma. In such form the calcium sulphate is uniform in consistency and chemical average and should be free from all carbonates. I next convert this extended product into physical form of as nearly uniform body as possible, as in nodules, balls or pellets, as in such condition it has a high percentage of voids and on that account may be burned with uniformity. The material so burned on account of its inherent finely divided and uniform condition requires less retention in the grinding mills used to complete the processing necessary prior to acceleration into a cement of the Keene type with a smaller percentage of the chemical accelerator required. I thus produce a Keene cement of greater purity, strength at a reduced grinding and accelerating cost.

On account of its fine and uniform crystalline structure the ultimate grinding of the cement is not only made very easy, but is easily made uniform and the fineness of the crystals makes the cement set with great strength after minimum acceleration and assures a maximum of plastic smoothness and hardness. While I may produce my finely divided initial calcium sulphate in various ways, my invention contemplates a source of great importance as developed in my previous Letters Patent No. 1,548,358.

The precipitated calcium sulphate from such a process is as developed by me a product of just that crystalline formation and strength as is required according to my present concept for the perfection of a Keene's cement. Such crystals by reason of their precipitation from the treated acidulated source are very pure and are free from any of those discoloring factors such as organic materials or metallic compounds present in the natural rock.

In the second phase of my concept, i. e. that of effecting a high degree of uniformity in burning, I propose to carry out this step again by creating an artificial condition in which a greater uniformity may be had than with material from natural sources or natural formation. I do this by re-forming my fine crystalline precipitate in standard units of suitable dimension for burning according to the character of the furnace used. This may be done by handling the precipitate in a plastic condition in which it may be formed by extrusion or molding or pelleting. For this purpose I may add a small amount of a binding or bonding material to assist in the formation of the units and/or to aid in maintaining the units in form during the roasting or burning. For example, I may add to the material to be furnaced a small amount of emulsified oil which increases the viscosity or plasticity of the precipitate, or I may use a small amount of calcined plaster which when agitated with the precipitate on account of its hygroscopic nature will seize upon the water present in the precipitate and set, forming porous nuclei for the pellets into which the crystalline precipitate is to be converted. This is an extremely advantageous manner of pelleting as the pellets build up rapidly, uniformly and are of such strength as to withstand feeding into the furnace, and in fact while permeable to heat are of such strength as to withstand movement as well as strong drafts within the furnace.

When so burned, preferably in pellets from the size of a pea to that of a marble, every part of the product is evenly heated and an extraordinarily high degree of uniformity attained.

Such a product may then be mixed with an accelerator and ground as may be desired. As one phase of my invention I add to my precipitated acidulated crystalline source any desired accelerator such as potassium aluminum sulphate incorporated with the emulsified oil which serves also the function of acting as a binder or aid in pelleting.

My product is a Keene cement, but a Keene cement of such high quality and improved characteristics as to be a new type. I do not, of course, claim Keene cement as such, as it is a product of great antiquity as first stated. My claims, therefore, are directed to the improved product as an improved Keene cement and a novel method of making the same both as to the source and formation of the calcium sulphate to be used and also as to the process or method of converting such into the ultimate cement.

What I therefore claim and desire to secure by Letters Patent is:

1. That method of producing an accelerated gypsum cement which consists in mixing finely divided crystalline precipitated calcium sulphate with a relatively small amount of plaster of Paris in the presence of a small amount of water, in pelletizing and in exposing to heat of high temperature.

2. That method of producing an accelerated gypsum cement which consists in mixing precipitated calcium sulphate with a relatively small amount of plaster of Paris, in moistening with water and agitating to produce pellets and in exposing to heat of high temperature.

3. A material for the production of Keene's cement comprising precipitated calcium sulphate and a relatively small amount of plaster of Paris in coherent unitary form for burning under draft.

ROBERT S. EDWARDS.